United States Patent Office 3,790,628
Patented Feb. 5, 1974

3,790,628
PURIFICATION OF PERCHLOROMETHYL MERCAPTAN
Albert M. Leon, Mamaroneck, and Robert C. Whittington, Bronx, N.Y., assignors to Stauffer Chemical Company, New York, N.Y.
No Drawing. Filed Feb. 22, 1971, Ser. No. 117,685
Int. Cl. C07c 145/00
U.S. Cl. 260—543 H                   5 Claims

ABSTRACT OF THE DISCLOSURE

This invention provides a process for the purification of perchloromethyl mercaptan. The purification process comprises thoroughly mixing an impure perchloromethyl mercaptan solution with water for a period between about 1 and about 3 minutes, and separating and removing from the mixture a substantially pure product of perchloromethyl mercaptan.

---

This invention relates to a process for the purification of perchloromethyl mercaptan.

In producing perchloromethyl mercaptan by known processes, it generally contains a certain amount of impurity, such as sulfur monochloride. Generally, the perchloromethyl mercaptan produced, is between about 85 and about 96% pure. Perchloromethyl mercaptan is used to make Captan (N-trichloromethyl mercapto-4-cyclohexene-1,2-dicarboxylamide) which is useful in feed treatment and as a fungicide in paint and plastics, leather and fabrics. The purity and yield of the resultant Captan is dependent upon the purity or quality of the perchloromethyl mercaptan from which it is prepared. Thus, with a less pure perchloromethyl mercaptan, the Captan produced therefrom would not have the necessary quality to be used for example, as a fungicide in a paint or leather. Therefore, there is a need for the further purification of the perchloromethyl mercaptan.

Accordingly, it is a primary object of the present invention to provide a process for the purification of perchloromethyl mercaptan.

The present invention provides for the purification of perchloromethyl mercaptan by a process which comprises thoroughly mixing the impure perchloromethyl mercaptan with a sufficient amount of water for a short period of time and separating the purified perchloromethyl mercaptan.

The water is thoroughly mixed with the perchloromethyl mercaptan (PMM) in the ratio of PMM to water preferably between about 1.0:.75 and about 1.0:4.0 by volume for a period preferably between about 1 and about 3 minutes, i.e. for a period of time sufficient to hydrolyze the sulfur monochloride but short enough to eliminate any significant hydrolysis of the PMM. After the water and PMM are sufficiently mixed, the inorganic or aqueous layer of the mixture containing the hydrolysis products of sulfur monochloride is first separated, and then the remaining organic phase containing the PMM and sulfur is filtered to obtain a substantially pure PMM product.

The water is thoroughly mixed or agitated with the PMM at a temperature ranging between about 10° C. and about 50° C. The ratio of the PMM to water is dependent upon the purity of the PMM. The lower the purity of the PMM, the greater the amount of water used. For example, when the purity of the PMM is 90%, the ratio of PMM to water is about 1:3, by volume. The preferred ratio of the PMM to water is about 1:1, by volume.

It is important that the water and the impure PMM are thoroughly agitated for a period between about 1 and about 3 minutes, in order to hydrolyze the $S_2Cl_2$ and to eliminate any significant hydrolysis of the PMM. If the PMM solution was thoroughly mixed for a longer period of time, e.g. from 7 to 10 minutes, and were allowed to hydrolyze, there would be more sulfur generated and this would make the separation of the PMM more difficult, if not impossible, and even more critical, the recovered yield of the purified PMM product would be substantially decreased.

The period of time for the thorough agitation is dependent, as is the ratio of water to PMM, on the purity of the PMM being purified. That is, the lower the purity of the PMM, the longer the period of agitation of the PMM and water. For example, when the purity of the PMM is 90%, the period of agitation is at least about 3 minutes.

It is important in the present purification process of PMM to properly control the ratio of PMM to water as well as the period of time for agitating the water and PMM mixture. As indicated, these two conditions are dependent upon the purity of the PMM being washed with water. Accordingly, one skilled in the art can determine the ratio of the PMM to water, and the period of time of agitation needed to hydrolyze the $S_2Cl_2$, and to eliminate the hydrolysis of the PMM.

After the water and PMM solution containing $S_2Cl_2$, have been sufficiently mixed, two phases or layers are formed. One phase is an inorganic or aqueous phase containing the hydrolysis products of sulfur monochloride and the other, an organic phase containing PMM and sulfur. The PMM can be separated by any suitable means. The PMM can be separated by first decanting or pouring off the inorganic phase containing the water and hydrolysis products of sulfur monochloride, and then filtering the organic phase containing the PMM and sulfur to provide a substantially pure product of PMM in the range of between about 98 and 100%.

The perchloromethyl mercaptan which is purified according to the present invention can be prepared and processed by known methods in the art. One method of producing the perchloromethyl mercaptan is by the direct chlorination of carbon disulfide with an iodine catalyst at low temperatures of between 0 and 10° C. The reaction product obtained contains perchloromethyl mercaptan, sulfur dichloride and generally a small quantity of sulfur monochloride. The sulfur dichloride is removed by distillation means leaving a perchloromethyl mercaptan mixture with the impurity of sulfur monochloride in a small percentage. It is this mixture of perchloromethyl mercaptan that is purified according to the present process.

The following examples will serve to further illustrate the advantages of the present invention and are to be considered as illustrative only, and not as limitations thereof.

EXAMPLE 1

A feed of 91% pure perchloromethyl mercaptan containing sulfur monochloride, was mixed with water in a volume ratio of PMM to water of about 1:3 in a well agitated reactor for a period of about 2 minutes. The resulting mixture consisted of an inorganic or aqueous phase containing water and the hydrolysis products of sulfur monochloride, and an organic phase containing PMM and sulfur. The aqueous phase was decanted off and the organic phase was filtered to provide the PMM in a substantially free-state.

The product purity was greater than 99% as analyzed by gas chromatography.

EXAMPLE II

A feed of 96% pure perchloromethyl mercaptan containing sulfur monochloride was mixed well with an equal volume of water in a well agitated reactor. The water and perchloromethyl mercaptan were mixed for a period of between 1 and 2 minutes. The reaction mixture was continually withdrawn with the perchloromethyl mercaptan and free sulfur being separated in the organic phase from the inorganic phase by decantation. The organic phase was subsequently filtered to yield a substantially purified PMM.

The product purity was greater than 99% as analyzed by gas chromatography.

EXAMPLE III

A group of similar samples of PMM were purified with water, as described in Examples 1 and 2, above. The samples of PMM each had a purity of 94.0%. Each sample of PMM was mixed with an equal volume of water at a temperature of about 40° C. for a different period of time. The time conditions and results of the runs are set forth in the table below.

PURIFICATION OF PMM

| | | Percent | |
|---|---|---|---|
| | Mixing time | Product purification | Product yield |
| Run: | | | |
| A | 1 | 99+ | 99.9 |
| B | 3 | 99+ | 99.8 |
| C | 5 | 99+ | 94.6 |
| D | 7 | 99+ | 91.8 |
| E | 10 | 99+ | 88.6 |

As shown in the table, although the purity was the same, the yield of PMM decreased in direct proportion to the increase in the period of time of mixing the PMM with water.

What is claimed is:

1. A process for purifying a perchloromethyl mercaptan solution containing sulfur monochloride which comprises thoroughly mixing water and the said perchloromethyl mercaptan solution in a volume ratio of perchloromethyl mercaptan to water ranging between about 1.0:0.75 and about 1.0:4.0 for a period of time sufficient to hydrolyze the sulfur monochloride but short enough to eliminate any significant hydrolysis of the perchloromethyl mercaptan, separating the resultant perchloromethyl mercaptan organic phase from the aqueous phase and filtering said perchloromethyl mercaptan organic phase whereby a substantially pure product of perchloromethyl mercaptan is formed.

2. A process according to claim 1, wherein the perchloromethyl mercaptan and water are thoroughly mixed for a period between about 1 and about 3 minutes.

3. A process according to claim 1, wherein the perchloromethyl mercaptan solution and water are mixed at a temperature ranging between about 10° C. and about 50° C.

4. A process according to claim 1, wherein the perchloromethyl mercaptan solution which is being subjected to said process has a purity ranging between about 85% and about 96%.

5. A process according to claim 2, wherein the perchloromethyl mercaptan solution and water are mixed in a volume ratio perchloromethyl mercaptan to water of about 1:1.

References Cited

UNITED STATES PATENTS

| 2,647,143 | 7/1953 | Pitt et al. | 260—543 H |
| 2,664,442 | 12/1953 | Kamlet | 260—543 H |
| 2,759,969 | 8/1956 | Jonas | 260—543 H |
| 3,144,482 | 8/1964 | Flay | 260—543 H |
| 3,144,483 | 8/1964 | Flay | 260—543 H |
| 2,821,554 | 1/1958 | Ospenson | 260—543 H |
| 3,296,302 | 1/1967 | Weil et al. | 260—543 H |
| 3,544,625 | 12/1970 | Masat et al. | 260—543 H |

LORRAINE A. WEINBERGER, Primary Examiner

R. D. KELLY, Assistant Examiner